(12) United States Patent
Young

(10) Patent No.: US 10,760,705 B2
(45) Date of Patent: Sep. 1, 2020

(54) DUAL PISTON PNEUMATIC ACTUATOR

(71) Applicant: Terry Glenn Young, Longview, TX (US)

(72) Inventor: Terry Glenn Young, Longview, TX (US)

(73) Assignee: Safoco, Inc., Houston, TX (US)

( * ) Notice: Subject to any disclaimer, the term of this patent is extended or adjusted under 35 U.S.C. 154(b) by 94 days.

(21) Appl. No.: 13/791,965

(22) Filed: Mar. 9, 2013

(65) Prior Publication Data

US 2013/0234055 A1    Sep. 12, 2013

Related U.S. Application Data

(60) Provisional application No. 61/609,119, filed on Mar. 9, 2012.

(51) Int. Cl.
*F16K 31/122* (2006.01)

(52) U.S. Cl.
CPC ........ *F16K 31/122* (2013.01); *F16K 31/1221* (2013.01); *F16K 31/1225* (2013.01)

(58) Field of Classification Search
CPC . F16K 31/122; F16K 31/1225; F16K 31/1221
USPC .................................................. 251/62, 63
See application file for complete search history.

(56) References Cited

U.S. PATENT DOCUMENTS

| | | | | |
|---|---|---|---|---|
| 3,485,141 A | * | 12/1969 | Douglas | F15B 11/0365 |
| | | | | 91/469 |
| 3,554,088 A | * | 1/1971 | Bruyn | B21J 15/105 |
| | | | | 92/128 |
| 3,752,040 A | * | 8/1973 | Pawloski | F15B 11/0365 |
| | | | | 91/466 |
| 4,230,299 A | * | 10/1980 | Pierce, Jr. | 251/14 |
| 4,423,748 A | * | 1/1984 | Ellett | 137/315.29 |
| 4,585,207 A | * | 4/1986 | Shelton | 251/62 |
| 4,650,151 A | * | 3/1987 | McIntyre | 251/14 |
| 4,840,347 A | * | 6/1989 | Ariizumi | F16K 31/1221 |
| | | | | 251/63.4 |
| 4,934,652 A | * | 6/1990 | Golden | 251/63.6 |
| 6,244,563 B1 | * | 6/2001 | Ejiri | F16K 31/1225 |
| | | | | 251/331 |
| 7,972,599 B2 | * | 7/2011 | Hirsch et al. | 424/145.1 |

* cited by examiner

*Primary Examiner* — Daphne M Barry
(74) *Attorney, Agent, or Firm* — Bushman Werner, P.C.

(57) ABSTRACT

Dual piston pneumatic actuators used in opening and closing gate valves are disclosed. The actuators allow for pressure to vary based on opening or closing a gate valve versus keeping the gate valve open or closed.

8 Claims, 2 Drawing Sheets

DUAL PISTON PNEUMATIC ACTUATOR

PRIORITY

This application claims priority to U.S. Provisional Application 61/609,119, filed on Mar. 9, 2012, the contents of which are specifically incorporated herein.

FIELD

The present disclosure relates to valves and actuators. More specifically, the disclosure relates to a pneumatic actuator with dual pistons.

BACKGROUND

A valve is a device that regulates the flow of a substance. Valves are produced in a variety of different styles, shapes and sizes. Typically, valves are used for gases and liquids. However, valves are also used on solids capable of flow, slurries or any other substance capable of flow. Valves are used in almost every industry having a substance that flows.

Gate valves are generally comprised of a valve body having a central axis aligned with inlet and outlet passages, and a space between the inlet and outlet passages in which a slide, or gate, may be moved perpendicular to the central axis to open and close the valve. In the closed position, the gate surfaces typically seal against sealing rings which surround the fluid passage through the valve body. Gate valves have been used for centuries to control the flow of a great variety of fluids. Often the fluid to be controlled by the gate valve is under pressure. In the petroleum industry, gate valves are used along piping at various locations, and in particular are used in piping referred to in the petroleum industry as a Christmas tree, which is used as part of a drilling operation.

Gate valves may be operated manually or automatically. One method to automatically operate a gate valve is to use an actuator. An actuator is a mechanical device for moving or controlling a mechanism or system. When an actuator is used in a gate valve, the actuator is typically linked to a stem to repeatedly move the valve gate between open and closed positions.

Actuators to open and close the gate valves may include manual operators, diaphragm-type operators, and hydraulic operators. The actuator may include a bonnet assembly, which interconnects the valve body and the valve gate, and a bonnet stem which is movable with the gate via an operator. The operator typically has a maximum force capability for applying to the bonnet stem. It is sometimes desirable to provide additional opening/closing power on a temporary basis without having to remove the original operator. It is also desirable that the same operator be adaptable to various control accessories, such as a mechanical override, hydraulic override, heat sensitive lock open device, block open cap, electrical limit switch and/or other electrical accessories.

In the use of pneumatic actuators, typically a pressure source is needed to provide pressure against the piston such that the piston is pushed in a proximal direction forcing the operator shaft and the gate of the gate valve to move in a proximal direction. Typically this results in closure of the gate valve in fail open types of valves. The amount of pressure needed to move a gate valve in a proximal direction is related to both the pressure entering the pressure chamber of a pneumatic piston actuator and the surface area of the piston.

However, in many applications, a strong pneumatic pressure source or a dedicated pneumatic pressure source to keep a gate valve closed (if designed to fail open for example) may not be available. It is also problematic when a pressure inlet hose needs to be diverted to another piece of equipment due to lack of pressure lines or failure of such other equipment.

What is needed is a method to allow a gate valve to be kept in an open position or closed position under pressure without requiring the full amount of pressure necessary to move the gate valve into the open position or the closed position.

SUMMARY

Embodiments of the invention disclosed herein pertain to an actuator for moving a valve gate between open and closed valve positions within a valve body. In such embodiments, the actuator may comprise an actuator housing having a proximal end oriented toward a gate valve and a distal end oriented away from the gate valve, the proximal end of the actuator housing operatively connected to a bonnet and the distal end of the actuator connected to a top cap; at least one distal pressure inlet in fluid communication with a distal pressure chamber, the distal pressure chamber having a distal side and a proximal side, the proximal side comprising a distal side of a distal piston; at least one proximal pressure inlet in fluid communication with a proximal pressure chamber, the proximal pressure chamber having a distal side and a proximal side, the proximal side comprising a distal side of a proximal piston; a distal downstop with a distal end and a proximal end, the distal end connected to or abutting a proximal side of the distal piston; and a proximal downstop with a distal end and a proximal end, the distal end connected to or abutting the a proximal side of the proximal piston.

In the aforementioned embodiment, the actuator may further comprise an operator shaft having a distal end and a proximal end, the operator shaft defining a shaft axis and wherein the distal end of the operator shaft is connected to the proximal end of the proximal downstop, and wherein the proximal end of the operator shaft extends through a packing retainer and through a bonnet and is operatively connected to a gate of a gate valve; and wherein a pressure from the distal pressure inlet pressurizes the distal pressure chamber and provides a force capable of moving the distal piston and the proximal piston in a proximal direction, and wherein a pressure from the proximal pressure inlet pressurizes the proximal pressure chamber and provides a force capable of moving the proximal piston in a proximal direction.

Still further, the actuator may comprise a spring having with a distal end abutting the proximal side of the proximal piston and having a distal end abutting a bonnet ring positioned at the proximal end of the actuator housing; the spring being capable of producing a biasing force opposing axial movement of the operator shaft toward the valve body.

Even further, the embodiment may concern a bonnet wherein the bonnet has an internal bore with an inward facing wall, wherein the packing retainer has a proximal end and an outward facing wall, and wherein the proximal end of the packing retainer is situated within the internal bore of the bonnet and wherein the outward facing wall of the packing retainer abuts the inward facing wall of the internal bore of the bonnet.

In embodiments of the invention concerning the pressure applied to the actuator, the pressure may be provided to both the distal pressure chamber and the proximal pressure chamber to provide an increased force to move both pistons in a proximal direction, and wherein the increased force moves the operator shaft to a proximal position, thereby moving the gate within the gate valve when the valve is under fluid pressure.

In embodiment of the invention concerning the removal of pressure, upon depressurization of the distal pressure chamber, the operator shaft may remain in the proximal position due to pressure from the proximal pressure chamber. Still further upon depressurization of the proximal pressure chamber, the operator shaft may remain in the proximal position due to pressure from the distal pressure chamber.

In embodiments of the invention regarding the structure of the actuator, in certain embodiments the actuator housing further comprises an inner pressure wall perpendicular to the shaft axis, the wall having an interior bore adapted to receive the proximal end of the distal downstop. In such embodiments the inner pressure wall may have a distal side and a proximal side, and wherein the proximal side of the inner pressure wall and the proximal end of the distal downstop form the distal side of the proximal pressure chamber.

Regarding the pressure inlets, in certain embodiments pressure enters the distal pressure chamber from at least one distal pressure inlet positioned within the top cap of the actuator. Additively or alternatively, pressure may enter the proximal pressure chamber from at least one proximal pressure inlet positioned between the proximal side and the distal side of the inner pressure wall.

Other embodiment of the invention concern an actuator for moving a valve gate between open and closed valve positions within a valve body, the actuator comprising: an actuator housing having a proximal end oriented toward a gate valve and a distal end oriented away from the gate valve, the proximal end of the actuator housing operatively connected to a bonnet and the distal end of the actuator connected to a top cap; a substantially cylindrical H frame with an inward facing wall and an outward facing wall, the outward facing wall oriented toward an inward facing wall of the actuator housing, the H frame further comprising: a distal H frame with an inward facing wall and an outward facing wall defining a distal H frame thickness; and a proximal H frame with an inward facing wall and an outward facing wall defining a proximal H frame thickness.

This embodiment may further comprise at least one pressure inlet in fluid communication with a distal pressure chamber, the distal pressure chamber having a distal side and a proximal side, the proximal side comprising a distal side of a distal piston, the distal piston further having an outward facing wall abutting the inward facing wall of the distal H frame; a top shaft with a distal end extending away from the actuator and a proximal end within a proximal pressure chamber, the proximal pressure chamber having a distal side and a proximal side, the proximal side comprising a distal side of a proximal piston, the proximal piston further having an outward facing wall abutting the inward facing wall of the distal H frame; a top shaft retainer operatively connecting the top shaft to the distal side of the distal piston; a proximal downstop with a distal end and a proximal end, the distal end connected to or abutting the a proximal side of the proximal piston; and an operator shaft having a distal end and a proximal end, the operator shaft defining a shaft axis and wherein the distal end of the operator shaft is connected to the proximal end of the proximal downstop, and wherein the proximal end of the operator shaft extends through a packing retainer and through a bonnet and is operatively connected to a gate of a gate valve.

In such an embodiment a pressure from the pressure inlet pressurizes the distal pressure chamber and provides a force capable of moving the distal piston and the proximal piston in a proximal direction.

In such an aforementioned embodiment, upon pressurization of the distal pressure chamber, the top shaft retainer forces movement of the top shaft in a proximal direction. Further, the proximal end of the top shaft may be connected to or abut the distal side of the proximal piston.

In further embodiments regarding the top shaft, the top shaft may comprise an outer wall and a top shaft bore parallel to the shaft axis, a distal bore within the distal pressure chamber and traversing from the outer wall to the top shaft bore; and a proximal bore within the proximal pressure chamber traversing from the top shaft bore to the outer wall. Further pressure may be provided to both the distal pressure chamber and the proximal pressure chamber to provide an increased force to move both pistons in a proximal direction, and wherein the increased force moves the operator shaft to a proximal position, thereby moving the gate within the gate valve when the valve is under fluid pressure.

In aspects of the aforementioned embodiment concerning the H frame and pistons, the distal pressure chamber has an H frame with a one thickness that is different than the proximal pressure chamber with another thickness and the distal piston has one circumference that is different than the proximal piston with another circumference.

Further, regarding pressure, pressure may flow through the distal bore, the top shaft bore and out the proximal bore to provide pressure to the proximal pressure chamber.

Regarding the structure of the actuator housing in this embodiment, the actuator housing may further comprise an inner pressure wall perpendicular to the shaft axis, the wall having an interior bore adapted to receive the proximal end of the top shaft. Further, the inner pressure wall may have a distal side and a proximal side, wherein the proximal side of the inner pressure wall and the top shaft form the distal side of the proximal pressure chamber.

Figure 1:
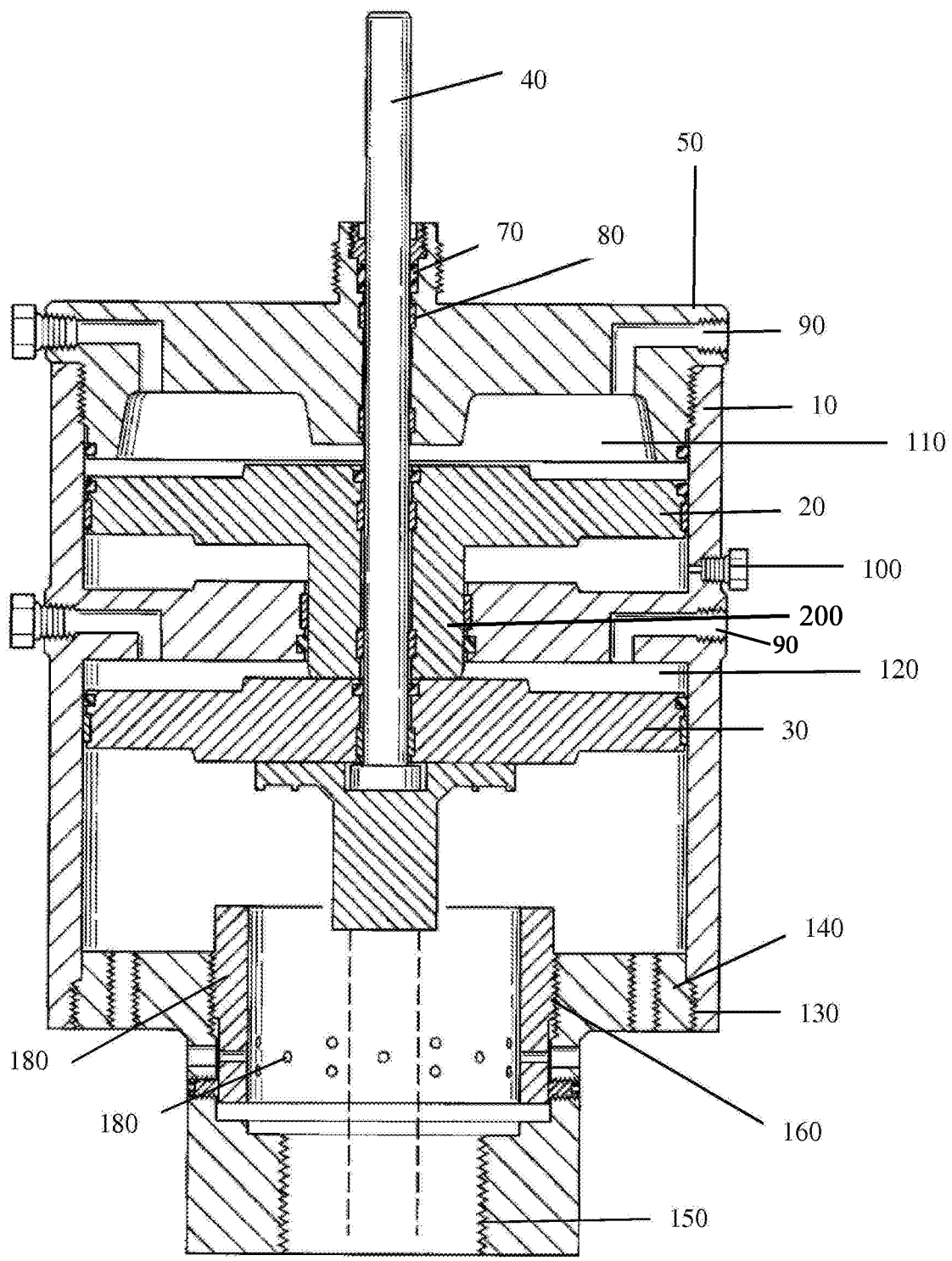
FIG. 1 is an illustration of a dual piston pneumatic actuator with two inlet ports.

LIST OF REFERENCE NUMERALS 10 housing
20 distal piston
30 proximal piston
40 top shaft
45 top shaft retainer ring
50 top cap
55 retainer ring grooves
60 internal bore
65 O-ring seals
70 polypack seals
75 internal top shaft bore
80 ware bearings
85 distal T-shaped perpendicular bore
90 pneumatic entry ports
95 proximal T-shaped perpendicular bore
100 burst discs
105 unified pneumatic entry port
110 distal pneumatic flow path 115 distal pressure chamber
120 proximal pneumatic flow path
125 proximal pressure chamber
130 internal threading
140 bonnet ring
150 bonnet threading
160 actuator proximal internal threading
170 adjustable stroke component
180 adjustment ports
190 set screws
200 downstop
210 operator shaft
220 packing retainer
230 bonnet
240 central spring
250 inner pressure wall
distal H frame 260
proximal H frame 270

DETAILED DESCRIPTION

Introduction

The embodiments of the invention relate to actuators. While an exemplary embodiment of the invention relates to hydraulic or pneumatic actuators, a method to adjust drift and spring tension within an actuator is intended to encompass piston and diaphragm actuators as well. The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3$^{rd}$ Edition.

As used herein, the term "pipe" means and refers to a fluid flow path.

As used herein, the term "conduit" means and refers to a fluid flow path.

As used herein, the term "line" means and refers to a fluid flow path.

As used herein, the term "fluid" refers to a non-solid material such as a gas, a liquid or a colloidal suspension capable of being transported through a pipe, line or conduit. Examples of fluids include by way of non-limiting examples the following: natural gas, propane, butane, gasoline, crude oil, mud, water, nitrogen, sulfuric acid and the like.

As used herein, the term "attached," or any conjugation thereof describes and refers to the at least partial connection of two items.

As used herein, the term "proximal" refers to a direction toward the center of the ball valve.

As used herein, the term "distal" refers to a direction away from the center of the ball valve.

As used herein, slidably connected referrers to one component abutting another component wherein one component is capable of moving in a proximal or distal direction relative to the other component.

Certain embodiments of the invention comprise a pneumatic actuator. In such embodiments, the actuator may have two pressure chambers.

Regarding the pressure chambers, in certain embodiments, the pressure chambers are proximal and distal to one another and centered with respect to an operator axis comprising the axis defined by the operator shaft. In other embodiments, the pressure chambers are proximal and distal to one another and offset with respect to the operator axis. In still further embodiments, the pressure chambers are in horizontal to each other, such that they are in the same axis which is perpendicular to the operator axis. Further regarding the pressure chambers, there is a plurality of pressure chambers. In most embodiments, the actuator possesses two pressure chambers. In other embodiments, the actuator possesses three or more pressure chambers.

In preferred embodiments, all the pressure chambers are within the same actuator housing. In alternate embodiments, the pressure chambers may be in separate housings and operatively connected via a connection between the top shaft of the proximally placed housing to the operator shaft of the distally placed housing.

In further embodiments of the invention concerning the pressure chambers, each pressure chamber comprises a separate pressure inlet port. In other embodiments of the invention concerning the pressure chambers, the pressure chambers comprise a single pressure inlet port In embodiments of the invention regarding the pistons, in certain embodiments each piston possesses a distal side, a proximal side and an outward facing wall. The outward facing wall is substantially cylindrical and defines a piston circumference. Further the outward facing wall abuts the inward facing wall of the actuator housing, an inward facing wall of a piston cylinder positioned within the actuator housing, or a combination thereof.

In further embodiments of the invention regarding the actuator housing, the piston cylinder or a combination thereof, the piston cylinder and the actuator housing have an outward facing wall in addition to an inward facing wall. The distance between the outward facing wall and the inward facing wall defines a thickness. In certain embodiments the outward facing wall has different thickness circumferentially located on either or both the piston wall or the housing wall. In such embodiments the different thicknesses may allow for pistons having different piston circumferences, to be placed in pressure chambers having different circumferences, such that the piston outward facing wall abuts the inward facing wall of the actuator housing, an inward facing wall of a piston cylinder positioned within the actuator housing, or a combination thereof.

In such embodiments concerning the piston circumference, when the piston circumferences between a distal piston and a proximal piston are substantially the same, the piston pressure area comprising the distal side of a piston is substantially the same between such distal piston and such proximal piston.

In other embodiments, when the piston circumferences between the distal piston and the proximal piston are different, the piston area comprising the distal side of a piston is different between such distal piston and such proximal piston.

In embodiments of the invention concerning the proximal side of the distal piston, the proximal side of the distal piston may possess a distal piston downstop. In certain embodiments, the distal piston downstop is in a unitary configuration with the piston. In other embodiments, the distal piston downstop is positioned within a distal piston bore such that the distal piston bore is adapted to receive the distal piston downstop such that pressure in the distal pressure chamber does not substantially leak pressure from the distal side of the distal piston through the distal piston bore.

In embodiments of the invention concerning the proximal side of the proximal piston, the proximal side of the proximal piston may possess a distal piston downstop. In certain embodiments, the proximal piston downstop is in a unitary configuration with the piston. In other embodiments, the proximal piston downstop is positioned within a proximal piston bore such that the proximal piston bore is adapted to receive the proximal piston downstop such that pressure in the proximal pressure chamber does not substantially leak pressure from the distal side of the proximal piston through the proximal piston bore.

In embodiments of the invention concerning the top shaft, in certain embodiments the top shaft passes through the distal piston, the distal piston downstop and the proximal piston and is secured to the proximal piston downstop between the distal side of the proximal piston downstop and the proximal side of the proximal piston. In such embodiments wherein the top shaft passes through the distal piston, the passage of the top shaft may prevent pressure from leaking from the distal piston chamber, the proximal piston chamber or both by a series of O-rings, polypack seals, ware bearings or a combination thereof between the distal side and the proximal side of each piston where the top shaft passes through.

In alternative embodiments concerning the top shaft, the top shaft may be retained with respect to the distal piston by a top shaft retainer ring such that pressurization of the distal pressure chamber pushes the top shaft in a proximal direction. In such instances, the top shaft retainer ring may further comprise grooves adapted to receive seals such as O-ring seals to prevent pressure leakage out of the distal pressure chamber. Still further, in certain embodiments, the top shaft, which is typically cylindrical but may be any polygonal shape, may have a circumference or perimeter which is smaller distal to the retainer ring and greater proximal to the top shaft retainer ring.

In further embodiments concerning the alternative top shaft, and in particular when the actuator possesses a single inlet port, the top shaft may possess an internal top shaft bore. At the distal end of the top shaft bore may be a distal T-shaped perpendicular bore. As will be understood by those of skill in the art, the T-shaped perpendicular bore may comprise multiple bores which are diagonal to perpendicular to the internal top shaft bore. Typically, when the distal pressure chamber is unpressurized, the distal T-shaped perpendicular bore will be within the top plug and not fluidly connected to the distal pressure chamber. Likewise, the proximal end of the top shaft bore may be a proximal T-shaped perpendicular bore. As will be understood by those of skill in the art, the distal T-shaped perpendicular bore may comprise multiple bores which are diagonal to perpendicular to the internal top shaft bore. In such embodiments, the proximal T-shaped perpendicular bore may be at all times fluidly connected to the proximal pressure chamber. Alternatively, the T shaped perpendicular bore may be rotated such that the proximal T-shaped perpendicular bore is fluidly connected to the proximal pressure chamber.

In such alternative embodiments, in operation, an actuator with a single pressure chamber pressurizes the distal pressure chamber. The top shaft retainer ring, the distal piston and the top shaft are pushed in a proximal direction due to the pressurization of the distal pressure chamber. Likewise, the movement of the top shaft in a proximal direction will push the proximal piston in a proximal direction. When the distal T-shaped perpendicular bore becomes proximal to the top plug due to proximal movement of the top shaft, the distal T-shaped perpendicular bore is moved in to fluid connection with the distal pressure chamber, thus allowing pressure to flow through the top shaft bore into the proximal pressure chamber to provide greater force in pushing the proximal piston in a proximal direction.

In the aforementioned embodiment, the combination of the distal pressure chamber and the proximal pressure chamber providing force in a proximal direction, forces the proximal piston downstop in a proximal direction with greater force. The operator shaft, which possesses a proximal end oriented toward the gate valve and a distal end connected to the proximal end of the proximal downstop, is pushed in a proximal direction, thus closing or opening the gate valve depending on valve configuration. By mechanism of action, the single pneumatic inlet port provides pressure to both the distal and proximal pressure chambers. As the pressure decreases from the pressure necessary to open or close the valve gate, the remaining pressure due to increased surface area provided by two pistons, is capable of keeping the valve in a closed or open state, depending on configuration. As an illustrative example, the actuator may require 1000 p.s.i. to open or close the gate valve by pushing the pistons in a proximal direction, depending on valve configuration. Likewise, to maintain the valve in said position, as purely an example, only 200 p.s.i. may be needed.

Likewise in such a design, the actuator may have an internal cylindrical H frame with a distal portion and a proximal portion, each having different thickness, with inward facing walls abutting each piston. By varying the thicknesses, differentially sized pistons with different circumferences may be used for the distal piston and proximal piston, thus allowing an operator to optimize the pressure needed to open, close or keep open or closed a gate valve. In such cases, the H frame has distal and proximal walls which are perpendicular or substantially perpendicular to the inner pressure wall which bifurcates the distal H frame wall and the proximal H frame wall.

In further embodiments of the actuator concerning the operator shaft, as stated previously the distal end of the operator shaft is connected to the proximal end of the proximal downstop. The proximal end of the operator shaft exits the proximal end of the actuator, through a packing retainer and into the bonnet. From the bonnet the operator shaft enters the valve body wherein it is connected to the gate of a gate valve.

In embodiments of the invention, surrounding the proximal downstop and the operator shaft alone or in combination is the central spring. The central spring inwardly faces the operator shaft, the downstop of a combination thereof. Likewise, the central spring outwardly faces the actuator housing. Still further, the central spring has a proximal end and a distal end. The distal end in most embodiments may abut the proximal side of the proximal piston, a proximal facing side of the downstop or a combination thereof. The proximal end of the central spring may abut the bonnet ring. Alternatively or additively, the proximal end of the central spring may abut a proximal spring retainer ring to prevent lateral movement of the spring relative to the operator shaft.

In embodiments of the invention concerning the bonnet ring, the bonnet ring is typically cylindrical with a circumference the same as or less than that of the actuator housing. Typically, when the bonnet ring has a circumference less than the actuator housing, the bonnet ring has an outward facing wall abutting the inward facing wall of the actuator housing. In certain embodiments, the interface between the inward facing wall of the actuator housing and the outward facing wall of the bonnet ring is a threaded interface. In other embodiments, the actuator housing and the bonnet ring may have a series of bores adapted to receive bolts to secure the actuator housing to the bonnet ring.

In further embodiments concerning the bonnet ring, the bonnet ring may have an internal bore adapted to receive the actuator bonnet. In most embodiments of the invention, the bonnet ring is secured to the bonnet. In certain embodiments, the bonnet comprises one or more distal to proximal bores abutting the proximal side of the bonnet ring. In such embodiments the bonnet ring may possess corresponding distal to proximal bores which align with the distal to proximal bores of the bonnet. In such embodiments, the aligned bores are adapted to receive bolts, such as threaded bolts which may be threaded into the bores to secure the bonnet to the bonnet ring. In other embodiments concerning the bonnet ring, the bonnet ring may have an internal bore with a threaded inward facing wall adapted to receive a threaded outward facing wall of the distal neck of the bonnet.

In embodiments concerning the bonnet, the bonnet may further comprise an inner bore adapted to receive a packing retainer. In such embodiments, the inner bore may have a threaded inward facing wall adapted to receive a threaded outward facing wall of a packing retainer. The packing retainer itself may have an internal bore adapted to receive the operator shaft as it moves in a proximal or distal direction.

Referring now to FIG. 1 is a cross sectional illustration of one embodiment of the present invention. As can be seen, the double piston actuator has a housing 10. The actuator further comprises a distal piston 20 and a proximal piston 30.

The actuator further has a top shaft 40 at what may be considered the distal end of the actuator, which would be away from a valve. The top shaft 40 is slidably disposed within a top cap 50. The top cap further comprises an internal bore 60, polypack seals 70 and ware bearings 80. Polypack seals 70 and ware bearings 80 are also located within the distal piston and the proximal piston through which the top shaft is slidably disposed. A plurality of pneumatic entry ports 90 are positioned on the side of the top cap 50. Likewise, a plurality of pneumatic entry ports 90 is positioned on the side of the housing 10. Certain pneumatic entry ports 90 may be blocked with burst discs 100. The actuator further comprises a distal pneumatic flow path 110 and a proximal pneumatic flow path 120.

In practice, the distal piston 20 and the proximal piston 30 move together when pressure is applied to the pneumatic entry ports 90 from a pneumatic source. However, it is conceivable that only the proximal piston 30 may be moved if the pneumatic pressure is not applied in a way to affect the distal piston 20.

The actuator housing possesses internal threading 130 at or near its proximal end which may be used to thread onto the bonnet ring 140, which is adapted to accept the internal threading of the actuator housing. The bonnet ring further has bonnet threading 150 adapted to receive a bonnet. The bonnet ring, near its distal end possesses actuator proximal internal threading 160 adapted to receive an adjustable stroke component 170.

The stroke of the actuator and a gate valve may be set by rotating the adjustable stroke component 170. Adjustment may be made by adjustment ports 180 located on the bonnet ring. In implementation, there are three rows of adjustment ports. After the adjustable stroke component 170 is adjusted, it can be tightened by set screws 190 which are threaded into bores located on the bonnet ring. The terminal end of the set screws can contact the adjustable stroke component to prevent rotation.

Concerning the top shaft, the proximal end of the top shaft possesses a flanged region, which is positioned between the proximal side of the proximal piston and the distal side of a downstop 200. The downstop 200 may be further threaded to receive an operator shaft from its proximal end.

Figure 2:
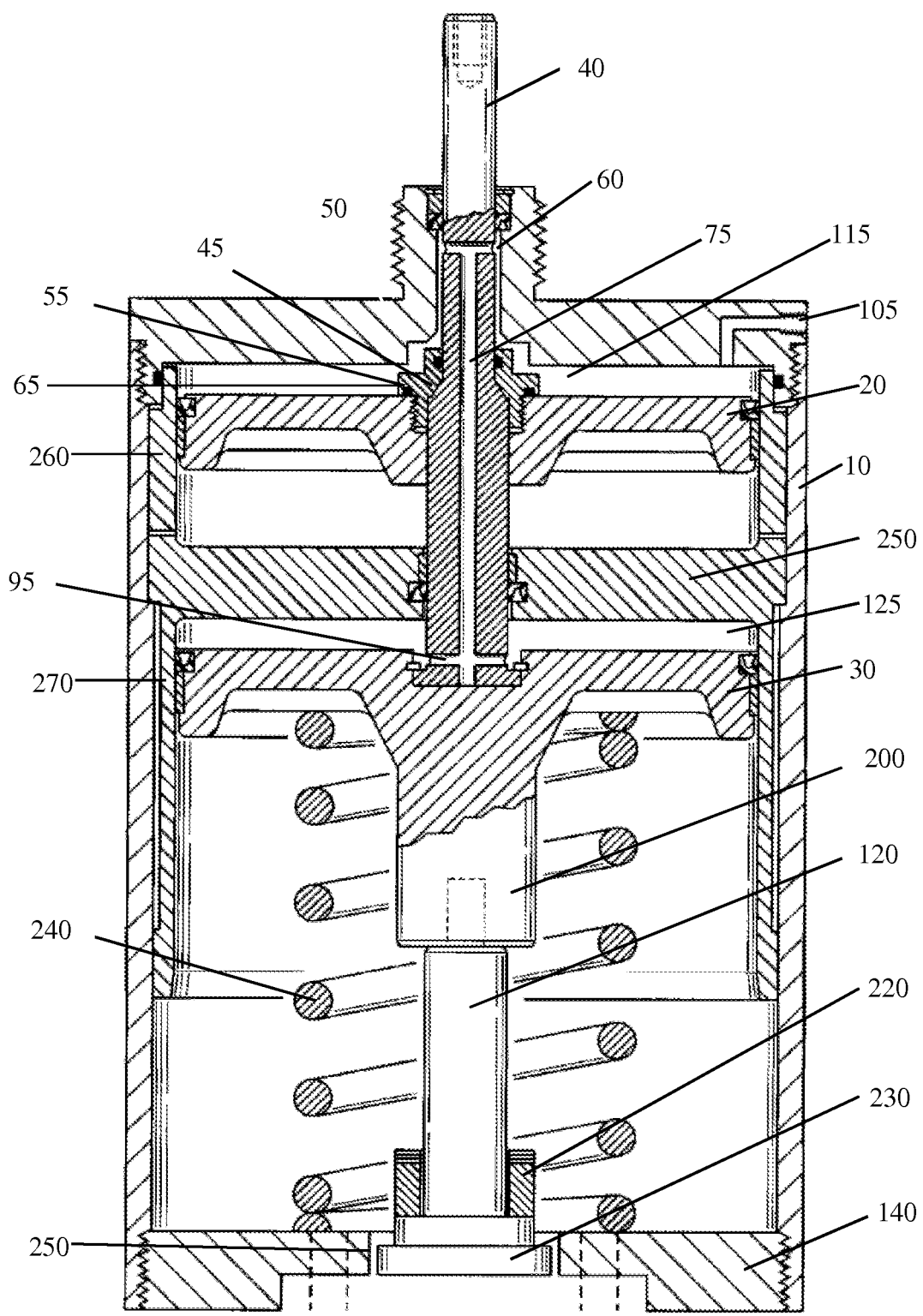
FIG. 2 is an illustration of a dual piston pneumatic actuator with a single inlet port.

Referring now to FIG. 2 is a cross sectional illustration of one embodiment of the present invention. As can be seen, the double piston actuator has a housing 10. The actuator further comprises a distal piston 20 and a proximal piston 30. Further, the double piston actuator has an internal H frame 15 with a distal pressure wall 250 between the distal H frame 260 and the proximal H frame 270. In such embodiments the distal H frame 260 and the proximal H frame 270 comprise cylinders with inward facing walls and outward facing walls. The inward facing walls of both the distal H frame 260 and the proximal H frame 270 abut the distal piston 20 and the proximal piston 30 respectively. Each of the distal H frame 260 and the proximal H frame 270 have a thickness between their outward facing walls and inward facing walls. The thickness need not be identical for the distal H frame 260 and the proximal H frame 270 distal H frame 260 and the proximal H frame 270. By varying the thickness, the actuator may have differentially sized distal 20 and proximal 30 pistons. The differentially sized pistons may vary in circumference.

By varying the circumference of the differentially sized pistons, the amount of pressure needed for opening and closing a gate valve may be modified for different applications or fluid pressures flowing through the gate valve.

The actuator further has a top shaft 40 at what may be considered the distal end of the actuator, which would be away from a valve. The top shaft 40 is slidably disposed within a top cap 50. The top cap further comprises an internal bore 60 and polypack seals 70.

As can be further seen in FIG. 2, the top shaft 40 is retained by the distal piston 20 by a top shaft retainer ring 45. Further the top shaft retainer ring 45 further is depicted as possessing retainer ring grooves 55 to receive O-ring seals 65. The top shaft retainer ring 45 is threaded into the distal side of the distal piston 20 in this embodiment.

As can be further seen, the top shaft possesses an internal top shaft bore 75 in a proximal to distal axis. At the distal end of the internal top shaft bore 75 is a distal T-shaped perpendicular bore 85. At the proximal end of the internal top shaft bore is a proximal T-shaped perpendicular bore 95.

Unlike FIG. 1, which depicts a plurality of pneumatic entry ports 90, FIG. 2 depicts a unified pneumatic entry port 105. In operation, the unified pneumatic entry port provides entry into the actuator for pneumatic pressure to pressurize the distal pressure chamber 115. During pressurization of the distal pressure chamber 115, the top shaft 40 and the distal piston 20 move in a proximal direction. Likewise, the proximal piston 30 moves in a proximal direction. As the distal end of the top shaft exits the bore of the top cap 50 while moving in a proximal direction, pneumatic pressure enters the distal T-shaped perpendicular bore 85, travels through the internal top shaft bore 75 and exits the proximal T-shaped perpendicular bore 95 into the proximal pressure chamber 125. Further, as can be seen from FIG. 2 and which is applicable to FIG. 1, separating the distal piston 20 from the proximal pressure chamber 125 and proximal piston 30 is an inner pressure wall As can be further seen from FIG. 2, and features which are applicable to FIG. 1, an operator shaft 210, defining an operator shaft axis, has a distal end in connection with the proximal end of the downstop 200. The downstop further having a distal end abutting the proximal side of the proximal piston. The proximal end of the operator shaft 210 exits the proximal end of the actuator, through a packing retainer 220 and into the bonnet 230. From the bonnet, the operator shaft enters a valve body (not shown) wherein it is connected to a gate valve.

Further viewed in FIG. 2 and applicable in FIG. 1 is a central spring 240 surrounding the operator shaft 210. The central spring 240 possesses a proximal end abutting the bonnet ring 140 and a distal end abutting the proximal side of the proximal piston 30.

Regarding the bonnet ring 140 connection with the bonnet 230 as depicted in FIG. 2, the bonnet ring 140 is cylindrical with a circumference less than that of the actuator housing 10 such as to fit within the actuator housing and about the inner wall of the actuator housing 10. The bonnet ring 140 has an internal bore 250 adapted to receive the bonnet 230.

The foregoing detailed disclosure and description of the invention is illustrative and explanatory thereof, and it will be appreciated by those skilled in the art, that various changes in the size, shape and materials as well as in the details of the illustrated construction, reliability configurations, or combination of features of the various valve actuator elements of the present invention may be made without departing from the spirit of the invention.

I claim:

1. An actuator, comprising:
    a cylindrical actuator housing having a first end, a second end, and a cylindrical inner wall surface;
    an end cap connected to said first end of said housing;
    a base connected to said second end of said housing;
    a sleeve positioned in said housing, said sleeve being generally H-shaped when viewed in longitudinal section, said sleeve including a first cylindrical portion extending in a first direction and forming a first piston sleeve having a first diameter, and a second cylindrical portion extending in a second direction and forming a second piston sleeve having a second diameter, and a circular plate, said circular plate having a central aperture therethrough, said first piston sleeve and said circular plate forming in part a first chamber, said second piston sleeve and said circular plate forming in part a second chamber;
    an actuator port in open communication with said first chamber for introducing fluid to and exhausting fluid from said actuator, said actuator port being the only port through which fluid is introduced to and exhausted from said actuator;
    a first piston disposed in said first chamber for reciprocal movement therein, said first cylindrical portion of said sleeve being in surrounding relationship to said first piston;
    a second piston disposed in said second chamber for reciprocal movement therein, said second cylindrical portion of said sleeve being in surrounding relationship to said second piston;
    an actuator shaft connected to said first piston and said second piston and extending through said aperture in said circular plate, said actuator shaft having a longitudinal bore, a first transverse passageway in said actuator shaft in open communication with said longitudinal bore, and a second, axially spaced transverse passageway in open communication with said longitudinal bore and said second chamber, wherein when said actuator is unpressurized, said first transverse passageway is positioned within said end cap and not in open communication with said first chamber.

2. The actuator of claim 1 wherein said first and second diameters are different.

3. The actuator of claim 1, wherein said first and second diameters are the same.

4. The actuator of claim 1, wherein said generally H-shaped sleeve is monolithic.

5. The actuator of claim 1, wherein said first and second transverse passageways are axially spaced such that pressure applied to said first chamber acts on said first piston causing movement of said first piston and said actuator shaft until such time as said first transverse passageway is brought into register with said first chamber whereby fluid pressure in said first chamber is then communicated to said longitudinal bore and then said second transverse passageway.

6. An actuator, comprising:
    a cylindrical actuator housing having a first end, a second end, and an interior wall;
    an end cap connected to said first end of said housing;
    a base connected to said second end of said housing;
    a circular plate disposed in said housing and connected to said interior wall of said housing, said circular plate having a first side, a second side, and a central aperture therethrough, a first chamber being formed between said end cap and said first side of said circular plate and a second chamber being formed between said base and said second side of said circular plate;
    an actuator port in open communication with said first chamber for introducing fluid to and exhausting fluid from said actuator, said actuator port being the only port through which fluid is introduced to and exhausted from said actuator;
    a first piston disposed in said first chamber for reciprocal movement therein;
    a second piston disposed in said second chamber for reciprocal movement therein;
    an actuator shaft extending through said end cap and said circular plate and fixedly connected to said first and second pistons, whereby said first and second pistons move in unison for the same axial distance, said actuator shaft having a longitudinal bore, a first transverse passageway in said actuator shaft in open communication with said longitudinal bore, and a second, axially spaced transverse passageway in open communication with said longitudinal bore and said second chamber, wherein when said actuator is unpressurized, said first transverse passageway is positioned within said end cap and not in open communication with said first chamber;
    a compression spring disposed in said housing between said second side and said base.

7. The actuator of claim 6, wherein said first and second transverse passageways are axially spaced such that pressure applied to said first chamber acts on said first piston compressing said spring until such time as said first transverse passageway is moved into register with said first chamber whereby fluid pressure in said first chamber is then communicated to said longitudinal bore and to said second chamber.

8. An actuator, comprising:
a cylindrical actuator housing having a first end, a second end, and an interior wall;
an end cap connected to said first end of said housing;
a base connected to said second end of said housing, said base having a central opening;
an adjustable sleeve received in said opening of said base;
a circular plate disposed interiorly of said cylindrical housing and connected to said interior wall of said housing, said circular plate having a first side, a second side, and a central aperture therethrough, a first chamber being formed between said end cap and said first side of said circular plate and a second chamber being formed between said base and said second side of said circular plate;
an actuator port in open communication with said first chamber for introducing fluid to and exhausting fluid from said actuator, said actuator port being the only port through which fluid is introduced to and exhausted from said actuator;
a first piston disposed in said first chamber for reciprocal movement therein, said first piston including a centrally disposed axially extending downstop, said downstop extending sealingly slidably through said central aperture;
a second piston disposed in said second chamber for reciprocal movement therein, said downstop on said first piston being engageable with said second piston; and
an actuator shaft slidably extending through said end cap said first piston and said circular plate, and fixedly connected to said second piston, said actuator shaft having a longitudinal bore, a first transverse passageway in said actuator shaft in open communication with said longitudinal bore, and a second, axially spaced transverse passageway in open communication with said longitudinal bore and said second chamber, wherein when said actuator is unpressurized, said first transverse passageway is positioned within said end cap and not in open communication with said first chamber.

* * * * *